J. S. PITTS.
HORSE RELEASER.
APPLICATION FILED JAN. 22, 1910.

979,332.

Patented Dec. 20, 1910.
2 SHEETS—SHEET 1.

Witnesses

Inventor
James S. Pitts,
By E. E. Vrooman,
his Attorney.

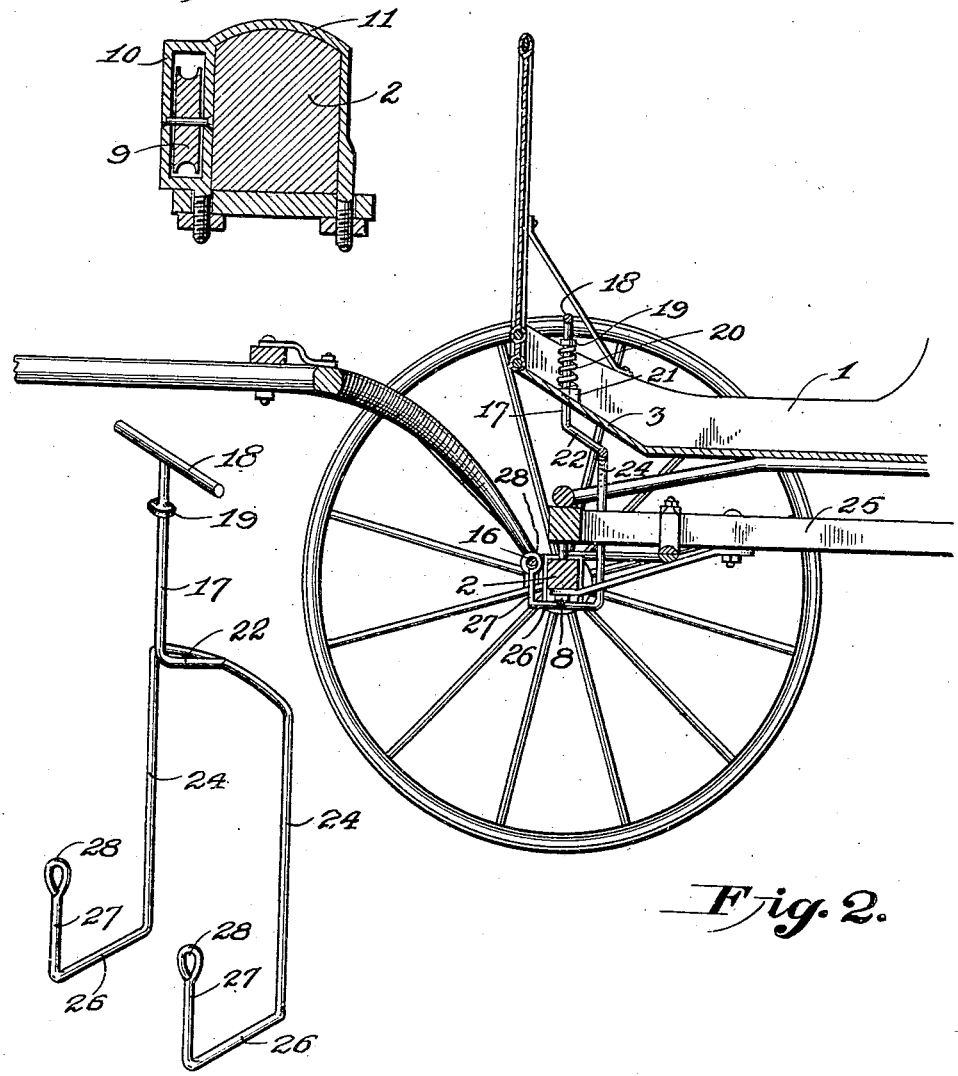

UNITED STATES PATENT OFFICE.

JAMES S. PITTS, OF GARVIN, OKLAHOMA.

HORSE-RELEASER.

979,332.

Specification of Letters Patent.   Patented Dec. 20, 1910.

Application filed January 22, 1910.   Serial No. 539,450.

*To all whom it may concern:*

Be it known that I, JAMES S. PITTS, a citizen of the United States of America, residing at Garvin, in the county of McCurtain and State of Oklahoma, have invented certain new and useful Improvements in Horse-Releasers, of which the following is a specification, reference being had therein to the accompanying drawing.

This invention relates to horse detaching devices by means of which the horse may be quickly detached from a vehicle so that in the event of a runaway or accident, damage to the vehicle and its occupants may be prevented.

In carrying out the object of the invention generally stated above it is contemplated providing the front axle with a pair of spring pressed slidably mounted locking pins for normally holding the shaft or tongue and axle members of the thills in coupled relation but which pins may be readily released from said thills by means of a spring pressed foot lever that projects into the body of the vehicle so that it may be operated by the foot of the driver.

In the practical application of the invention it will be understood, of course, that the essential features thereof are necessarily susceptible of changes in details and structural arrangements, one preferred and practical embodiment of which is shown in the accompanying drawings, wherein:—

Figure 1:
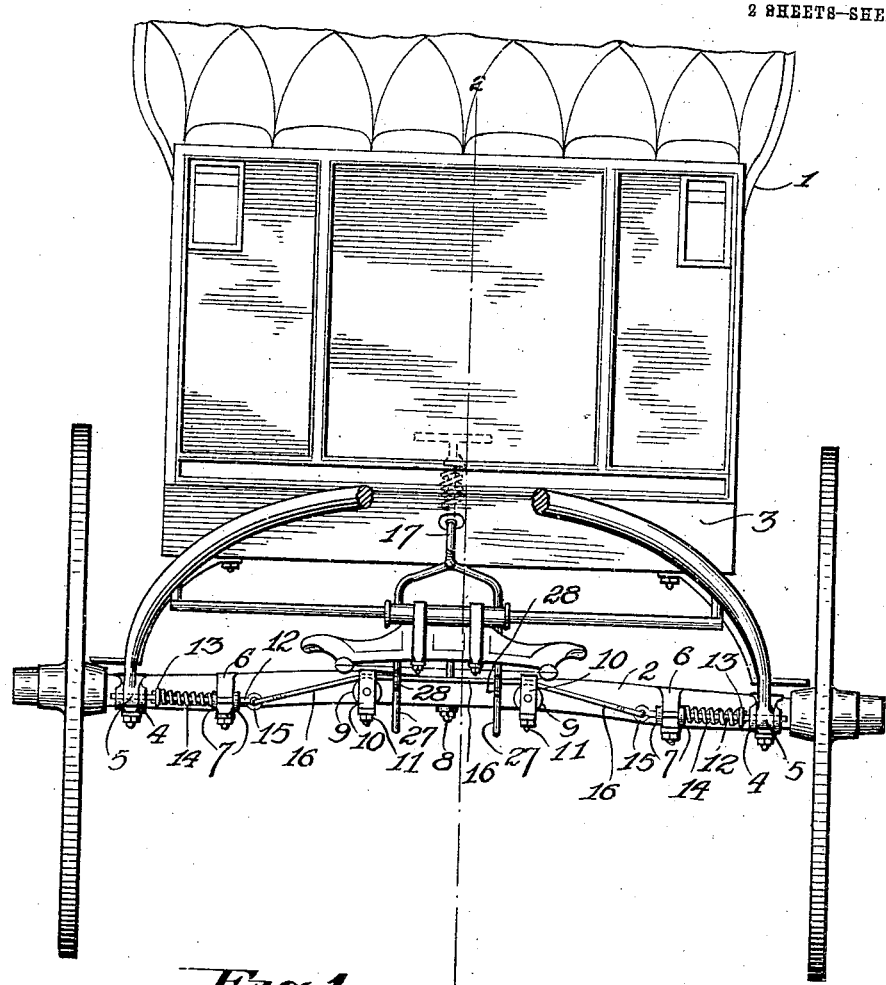
Figure 3:
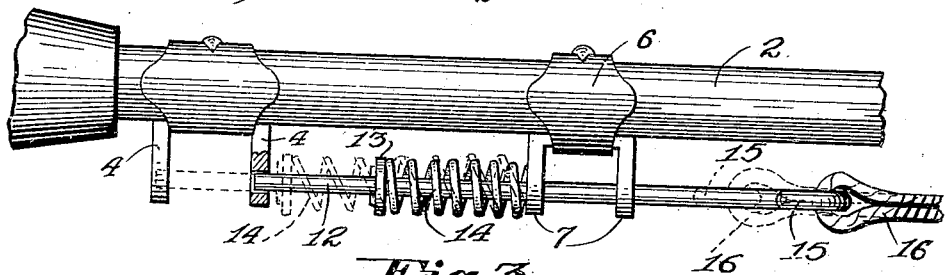

Figure 1 is a view in front elevation of a vehicle equipped with the improved detaching device. Fig. 2 is a fragmentary central vertical sectional view taken on the line 2—2, Fig. 1. Fig. 3 is a fragmentary front view of the front axle of the vehicle, showing one of the locking pins in a thill releasing position. Fig. 4 is a detail perspective view of the foot plunger for operating the detaching device. Fig. 5 is a vertical transverse sectional view of a vehicle axle showing the same equipped with a pulley and pulley housing which form a part of this invention.

Referring to said drawings by numerals, 1 designates a body of a vehicle, 2 the front axle therefor, and 3 the usual foot board of the body. Said axle is of the usual steel or other material structure and is equipped with the thill ears 4 adjacent each end which receive the thill ears 5, said ears 4 and 5 being equipped with the usual openings which register when the ears are assembled so that the shafts or tongue may be held in pivotal relation to the axle 1. Adjacent each set of thill ears 4 the axle is provided with a detachable axle clip 6, which surrounds the axle and clamps thereto a pair of forwardly projecting outstanding laterally arranged spaced apart guiding ears 7, which are preferably of the same type as the thill ears 4. To each side of the usual king bolt connection 8 between the axle 2 and the body 1, said axle has a pulley 9 held on its front surface, said pulley being rotatably mounted in a housing 10 of a detachable axle surrounding clip 11.

A locking pin 12 is slidably mounted in each set of guide ears 7 the outer end of said pin being adapted to enter the ears 4 and 5 of the thill coupling to hold said ears 4—5 in pivotal engagement. Said end of the pin 12 has an abutment 13 thereon against which one end of a spring 14 bears, the other end of said spring bearing against the ears 7 and normally exerting a pressure tending to force the locking pin into engagement with the ears of the thill coupling. The inner end of the pin 12 has an end eye 15, the end eye of each pin being connected by a cable 16, said cable 16 passing over the pulleys 9.

A foot plunger 17 is slidably and rotatably mounted in the foot board 3 of the vehicle, said plunger projecting above and below the said board and having its upper end equipped with a foot rest 18. Below said foot rest, the plunger is provided with an abutment 19 against which one end of a spring 20 coiled about the lever bears, the other end of said spring bearing against a block 21 carried by the foot board 3, said spring tending to force the lever upward relatively to the foot board. The foot plunger 17 is arranged over the king bolt of the vehicle and its portion below the foot board 3 is bent rearward at an angle as indicated at 22 and connects with a pendent forked vertical portion 24 that straddles the reach 25, the lower end of said forked portion being bent forwardly as indicated at 26 and extended beneath the axle 2 and then upturned, as indicated at 27 and provided with end eyes 28 through which the cable 15 passes.

From the foregoing description it will be seen that with the parts of the invention in the position shown in Fig. 1, a downward pressure on foot plunger 17 will cause its lower ends to exert a downward pressure on cable 15 between the two pulleys 9 thereby sliding locking pins 12 from the thills against the tension of springs 14, so that the shaft or tongue will be released from the axle.

It will be seen that the present invention provides means whereby the driver can readily release the horse from the vehicle when necessary, so that danger of damage to the vehicle is obviated.

What I claim as my invention is:—

1. In a device of the character described, the combination with a pair of axle clips provided with guiding eyes, of a thill locking pins slidable in each set of eyes, a cable connecting said pins, and a foot plunger having a forked bent end for straddling a portion of the running gear of a vehicle and surrounding the front axle thereof, said plunger terminating in end eyes for engagement with said cable.

2. A horse releasing device for vehicles, comprising a pair of thill pins adapted to be slidably mounted upon the front axle of a vehicle, a connecting cable for said pins, an operating plunger mounted in a vehicle, said plunger comprising a vertical rod terminating in a rearwardly-extending portion, and a U-shaped reach straddling member carried by said rod, the lower end of said member bent forwardly and upwardly to pass beneath said axle and terminating in eyes to receive said cable.

3. An operating plunger for a horse releasing mechanism, comprising a body portion, one end of said body portion bent at an angle to the major portion, a foot piece at the other end of said body portion, a substantially U-shaped member carried by said bent end, the arms of said U-shaped member adapted to straddle the reach of a vehicle and being bent forwardly at substantially right angles to said arms to pass beneath the front axle, and said forwardly-extending portion terminating in upstanding end portions provided with eyes.

In testimony whereof I hereunto affix my signature in presence of two witnesses.

JAMES S. PITTS.

Witnesses:
M. A. PITTS,
L. M. HASTINGS.